United States Patent
Lean et al.

(10) Patent No.: US 10,052,571 B2
(45) Date of Patent: Aug. 21, 2018

(54) FLUIDIC DEVICE AND METHOD FOR SEPARATION OF NEUTRALLY BUOYANT PARTICLES

(75) Inventors: Meng H. Lean, Santa Clara, CA (US); Jeonggi Seo, Albany, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 277 days.

(21) Appl. No.: 11/936,729

(22) Filed: Nov. 7, 2007

(65) Prior Publication Data
US 2009/0114607 A1  May 7, 2009

(51) Int. Cl.
*B01D 21/26* (2006.01)
*B03B 5/62* (2006.01)

(52) U.S. Cl.
CPC ............ *B01D 21/265* (2013.01); *B03B 5/626* (2013.01); *B01D 2221/10* (2013.01)

(58) Field of Classification Search
CPC .... B04C 5/12; B04C 1/00; B03B 5/62; B03B 5/626; B01D 21/26
USPC ......... 209/155–161, 724–734; 210/294, 204, 210/767, 805
See application file for complete search history.

(56) References Cited

U.S. PATENT DOCUMENTS

| | | | |
|---|---|---|---|
| 1,133,721 A * | 3/1915 | Gregg | 209/160 |
| 1,836,758 A | 12/1931 | Knapp | |
| 2,426,804 A | 9/1947 | Roy | |
| 2,584,976 A | 2/1952 | Bailey, Jr. | |
| 2,615,572 A | 10/1952 | Hodge | |
| 3,225,523 A | 12/1965 | Wiebe | |
| 3,672,503 A | 6/1972 | Mark | |
| 3,693,791 A | 9/1972 | Beck | |
| 3,893,921 A | 7/1975 | Walther et al. | |
| 3,933,642 A | 1/1976 | Wilson | |
| 3,948,771 A | 4/1976 | Bielefeldt | |

(Continued)

FOREIGN PATENT DOCUMENTS

| | | |
|---|---|---|
| CN | 1149556 | 5/1997 |
| DE | 2809630 | 9/1978 |

(Continued)

OTHER PUBLICATIONS

Gascoyne et al., "Particle Separation by Dielectrophoresis," Electrophoresis 2002, 23, pp. 1973-1983, Houston, Texas, 2002.

(Continued)

*Primary Examiner* — Patrick Cicchino
(74) *Attorney, Agent, or Firm* — Fay Sharpe LLP

(57) ABSTRACT

A technique using a curved channel of a spiral device to introduce a centrifugal force upon neutrally buoyant particles flowing in a fluid, e.g. water, to facilitate improved separation of such particles from the fluid is provided. As these neutrally buoyant particles flow through the channel, a tubular pinch effect causes the particles to flow in a tubular band. The introduced centrifugal force perturbs the tubular band (e.g. forces the tubular band to flow in a manner offset from a center of the channel), resulting in an asymmetric inertial migration of the band toward the inner wall of the channel. This allows for focusing and compaction of suspended particulates into a narrow band for extraction. The separation principle contemplated herein implements a balance of the centrifugal and fluidic forces to achieve asymmetric inertial equilibrium near the inner sidewall.

24 Claims, 9 Drawing Sheets

(56) References Cited

U.S. PATENT DOCUMENTS

| | | | |
|---|---|---|---|
| 4,001,121 A * | 1/1977 | Bielefeldt | 210/512.3 |
| 4,153,541 A | 5/1979 | Rumpf et al. | |
| 4,159,942 A | 7/1979 | Greer et al. | |
| 4,186,474 A | 2/1980 | Hine | |
| 4,189,378 A | 2/1980 | Wright et al. | |
| 4,292,050 A | 9/1981 | Linhardt et al. | |
| 4,324,334 A | 4/1982 | Wright et al. | |
| 4,343,707 A | 8/1982 | Lucas | |
| 4,383,917 A | 5/1983 | Wells | |
| 4,386,519 A | 6/1983 | Sinkey | |
| 4,451,367 A | 5/1984 | Ruggeri | |
| 4,460,391 A * | 7/1984 | Muller et al. | 55/343 |
| 4,462,907 A | 7/1984 | Waldecker | |
| 4,505,811 A | 3/1985 | Griffiths et al. | |
| 4,542,775 A | 9/1985 | Beck | |
| 4,795,553 A | 1/1989 | Giffard | |
| 4,872,972 A | 10/1989 | Wakabayashi et al. | |
| 4,927,437 A | 5/1990 | Richerson | |
| 5,059,226 A | 11/1991 | Schneider et al. | |
| 5,104,520 A * | 4/1992 | Maronde et al. | 209/210 |
| 5,120,436 A | 6/1992 | Reichner | |
| 5,193,688 A | 3/1993 | Giddings | |
| 5,314,529 A | 5/1994 | Tilton et al. | |
| 5,535,892 A | 7/1996 | Moorhead et al. | |
| 5,556,537 A | 9/1996 | Saarenketo | |
| 5,587,128 A | 12/1996 | Wilding et al. | |
| 5,632,957 A | 5/1997 | Heller et al. | |
| 5,653,859 A | 8/1997 | Parton et al. | |
| 5,690,763 A | 11/1997 | Ashmead et al. | |
| 5,715,946 A | 2/1998 | Reichenbach | |
| 5,728,262 A * | 3/1998 | Moss et al. | 162/4 |
| 5,958,240 A | 9/1999 | Hoel | |
| 5,971,158 A | 10/1999 | Yager et al. | |
| 5,993,668 A | 11/1999 | Duan | |
| 6,013,165 A | 1/2000 | Wiktorowicz et al. | |
| 6,087,608 A | 7/2000 | Schlichter et al. | |
| 6,100,535 A | 8/2000 | Mathies et al. | |
| 6,272,296 B1 | 8/2001 | Gartstein | |
| 6,355,491 B1 | 3/2002 | Zhou et al. | |
| 6,422,735 B1 | 7/2002 | Lang | |
| 6,454,945 B1 | 9/2002 | Weigl et al. | |
| 6,527,125 B2 | 3/2003 | Niitti | |
| 6,569,323 B1 * | 5/2003 | Pribytkov | 210/181 |
| 6,824,679 B1 | 11/2004 | Dzengeleski et al. | |
| 6,827,911 B1 | 12/2004 | Gering | |
| 6,905,029 B2 | 6/2005 | Flagan | |
| 7,104,405 B2 | 9/2006 | Bohm et al. | |
| 7,156,970 B2 | 1/2007 | Lean et al. | |
| 7,163,611 B2 | 1/2007 | Volkel et al. | |
| 7,226,542 B2 * | 6/2007 | Zemel et al. | 210/259 |
| 7,241,423 B2 | 7/2007 | Golbig et al. | |
| 7,282,129 B2 | 10/2007 | Lean et al. | |
| 7,431,228 B2 | 10/2008 | Bohm et al. | |
| 7,473,216 B2 | 1/2009 | Lolachi et al. | |
| 7,491,307 B2 | 2/2009 | Hsieh et al. | |
| 7,497,334 B2 | 3/2009 | Tyvoll et al. | |
| 7,534,336 B2 | 5/2009 | Voikel et al. | |
| 7,584,857 B2 * | 9/2009 | Bohm et al. | 209/155 |
| 7,770,738 B2 | 8/2010 | Tabata et al. | |
| 2002/0130068 A1 | 9/2002 | Fassbender et al. | |
| 2004/0038249 A1 | 2/2004 | Darteil et al. | |
| 2005/0084874 A1 | 4/2005 | Belfort et al. | |
| 2005/0183996 A1 | 8/2005 | Zemel et al. | |
| 2006/0087918 A1 | 4/2006 | Ji et al. | |
| 2006/0118479 A1 | 6/2006 | Shevkoplyas et al. | |
| 2006/0158640 A1 | 7/2006 | Molter et al. | |
| 2006/0240964 A1 | 10/2006 | Lolachi et al. | |
| 2008/0128331 A1 * | 6/2008 | Lean et al. | 209/155 |
| 2008/0134471 A1 | 6/2008 | Verdoes et al. | |
| 2009/0014360 A1 | 1/2009 | Toner et al. | |
| 2009/0050538 A1 | 2/2009 | Lean et al. | |
| 2009/0114601 A1 | 5/2009 | Lean et al. | |
| 2009/0283452 A1 | 11/2009 | Lean et al. | |
| 2009/0283455 A1 | 11/2009 | Lean et al. | |

FOREIGN PATENT DOCUMENTS

| | | |
|---|---|---|
| DE | 2829592 | 1/1980 |
| DE | 29 29 139 A1 | 1/1981 |
| DE | 3736504 | 3/1989 |
| DE | 4200802 | 7/1993 |
| DE | 19855256 | 6/2000 |
| DE | 10001737 | 10/2001 |
| DE | 102004039182 | 2/2006 |
| EP | 0448973 | 10/1991 |
| EP | 1407807 | 4/2004 |
| EP | 1681549 | 7/2006 |
| EP | 1795894 | 6/2007 |
| EP | 1 942 329 A2 | 7/2008 |
| EP | 2060312 | 5/2009 |
| FR | 2571354 | 4/1986 |
| FR | 2753392 | 3/1998 |
| GB | 330163 | 6/1930 |
| GB | 386080 A | 1/1933 |
| GB | 934423 | 8/1963 |
| GB | 1039485 | 8/1966 |
| GB | 2012192 | 7/1979 |
| GB | 2024038 | 1/1980 |
| GB | 2098091 | 11/1982 |
| GB | 2209969 | 6/1989 |
| JP | 60071083 | 4/1985 |
| JP | 63319017 | 12/1988 |
| JP | 5007795 A | 1/1993 |
| JP | 2001-064789 A | 3/2001 |
| JP | 2001121039 | 5/2001 |
| JP | 2004-330008 A | 11/2004 |
| JP | 2007069179 | 3/2007 |
| JP | 9299712 | 11/2007 |
| JP | 04504975 B2 | 7/2010 |
| KR | 20030003206 | 1/2003 |
| WO | WO8603140 | 6/1986 |
| WO | WO8810239 | 12/1988 |
| WO | WO9838134 | 9/1998 |
| WO | WO 2004/113877 A1 | 12/2004 |
| WO | WO2006056219 | 6/2006 |

OTHER PUBLICATIONS

Bennett et al., "Combined Field-Induces Dielectrophoresis and Phase Separation for Manipulating Particles in Microfluidics," American Institute of Physics, vol. 82, No. 23, pp. 4866-4868, Dec. 8, 2003.

Inglis et al., "Continuous Microfluidic Immunomagnetic Cell Separation," American Institute of Physics, vol. 85, No. 21, pp. 5093-5095, Nov. 22, 2004.

Giddings, "Field-Flow Fractionation: Analysis of Macromolecular, Colloidal, and Particulate Materials," Science, vol. 260, pp. 1456-1465, Jun. 4, 1993.

Reschiglian et al., "Field-Flow Fractionation and Biotechnology," Trends in Biotechnology, vol. 23, No. 9, pp. 475-483, Sep. 9, 2005.

Segré et al., "Radial Particle Displacements in Poiseuille Flow of Suspensions," Nature Publishing Group, No. 4760, pp. 209-210, Jan. 21, 1961.

Segre et al., "Behaviour of Macroscopic Rigid Spheres in Poiseuille. Flow Part 2. Experimental Results and Interpretation," Weizmann Institute of Schence, Rehovoth, Israel, pp. 136-157, received Nov. 6, 1961 and in revised form Mar. 16, 1962.

Leighton et al., "The Lift on a Small Sphere Touching a Plane in the Presence of a Simple Shear Flow," Journal of Applied Mathematice and Physics (ZAMP), vol. 36, pp. 174-178, Jan. 1985.

Cherukat et al., "The Inertial Lift on a Rigid Sphere in a Linear Shear Flow Field Near a Flat Wall," J. Fluid Mech. 1994, vol. 263, pp. 1-18, Received Mar. 8, 1993 and in revised form Aug. 18, 1993.

Rubinow et al., "The Transverse Force on a Spinning Sphere Moving in a Viscous Fluid," Institute of Mathematical Sciences, New York University, New York, pp. 447-459, Mar. 13, 1961.

Ho et al., "Inertial Migration of Rigid Spheres in two-Dimensional Unidirectional Flows," J. Fluid Mech. 1974, vol. 65, Part 2, pp. 365-400, Received Sep. 4, 1973.

(56) References Cited

OTHER PUBLICATIONS

Vasseur et al., "The Lateral Migration of a Spherical Particle in Two-Dimensional Shear Flows," J. Fluid Mech. 1976, vol. 78, Part 2, pp. 385-413, Received Dec. 4, 1975.
Feng et al., "Direct Simulation of Initial Value Problems for the Motion of Solid Bodies in a Newtonian Fluid. Part 2., Couette and Poiseuille Flows," J. Fluid Mech. 1994, vol. 277, pp. 271-301, Received Sep. 20, 1993 and in revised form May 11, 1994.
Asmolov, "The Inertial Lift on a Spherical Particle in a Plane Poiseuille Flow at Large Channel Reynolds Number," J. Fluid Mech. 1999, vol. 381, pp. 63-87, Received Feb. 28, 1997 and in revised form Sep. 10, 1998.
Asmolov, "The Inertial Lift on a Small Particle in a Weak-Shear Parabolic Flow," American Institute of Physics, vol. 14, No. 1, Jan. 2002.
Matas et al., "Inertial Migration of Rigid Spherical Particles in Poiseuille Flow," J. Fluid Mech. 2004, vol. 515, pp. 171-195, Received Apr. 17, 2003 and in revised form Apr. 19, 2004).
Yang et al., "Migration of a Sphere in Tube Flow," J. Fluid Mech. 2005, vol. 540, pp. 109-131, Received Mar. 30, 2004 and in revised form Apr. 13, 2005.
Michaelides, Hydrodynamic Force and Heat/Mass Transfer From Particles, Bubbles, and Drops—The Freeman Scholar Lecture, Journal of Fluids Engineering, vol. 125, pp. 209-238, Mar. 2003.
Cherukat et al., "Wall-Induced Lift on a Sphere," Int. J. Multiphase Flow, vol. 16, No. 5, 1990, pp. 899-907, Received Nov. 6, 1989 and in revised form Apr. 1, 1990).
Cherukat et al., "The Inertial Lift on a Rigid sphere Translating in a Linear Shear Flow Field," Int. J. Multiphase Flow, vol. 20, No. 2, 1994, pp. 339-353, Received Feb. 20, 1993 and in revised form Oct. 10, 1993.
Berger et al., "Flow in Curved Pipes," Ann. Rev. Fluid Mech. 1983, vol. 15, pp. 461-512, 1983.
Gupalo et al., "Velocity Field of a Liquid Stream in a Spiral Channel of Rectangular Cross Section," pp. 109-112. Translated from Izvestiya Adademii Nauk SSSR, Mekhanika Zhidkosti I Gaza, No. 1, pp. 131-136, Jan.-Feb. 1977. Original article submitted Jan. 8, 1976.
Dean, "Fluid Motion in a Curved Channel," Imperial College of Science, pp. 402-420, Jul. 31, 1928.
Sudarsan et al., "Multivortex Micromixing," Pnas, vol. 103, No. 19, pp. 7228-7233, May 9, 2006.
Xia et al., "Soft Lithography," Annu. Rev. Mater. Sci. 1998, vol. 28, pp. 153-184, 1998.
Sao et al., "Integrated Multiple Patch-Clamp Array Chip via Lateral Cell Trapping Junctions," American Institute of Physics, vol. 84, No. 11, pp. 1973-1975, Mar. 15, 2004.
Tuval I. et al., "Neutrally Buoyant Particles and Bailout Embeddings in Three-Dimensional Flows," 5th International Summer School/Conference Proceedings, Let's Face Chaos Through Nonlinear Dynamics (online), Jun. 30-Jul. 14, 2002, Jul. 2002 (retrieved on Jan. 21, 2009). Retrieved from the Internet: http://camtp.uni-mb.si/chaos/2002/reports/abstracts.shtml.
Australian Patent Office Search Report.
European Search Report for EP 08 16 8573 dated Jan. 24, 2011.
Ookawara et al., A Numerical Study of the Influence of Particle Density on Lift Force-Induced Separation in a Micro-Separator/Classifier by a Macroscopic Particle Model, Journal of Chemical Engineering of Japan, vol. 40, No. 11, pp. 986-992, 2007.
Ookawara et al., "Quasi-direct numerical simulation of life force-induced particle separation in a curved microchannel by use of a macroscopic particle model," Chemical Engineering Science 62, pp. 2454-2465, 2007.
Ookawara et al., "Applicability of a Miniaturized Micro-Separator/Classifier to Oil-Water Separation," Chem. Eng. Technol., 30, No. 3, pp. 316-321, 2007.
Ookawara et al., "Numerical study on development of particle concentration profiles in a curved microchannel," Chemical Engineering Science, 61, pp. 3714-3724, 2006.
Shinichi Ookawara et al., "The Influence of Channel Depth on the Performance of a Micro-Separator/Classifier," Kagaku Kogaku Ronbunshu, 30 (2), pp. 135-141, 2004.
Thiruvenkatachari et al., "Flocculation-cross-flow microfiltration hybrid system for natural organic matter (NOM) removal using hematite as a flocculent," Desalination, Elsevier, Amsterdam, NL, vol. 147, No. 1-3, XP 004386413, pp. 83-88, Sep. 10, 2002.
Yang et al., "Particle Separation in Microfluidic Channels Using Flow Rate Control," Proceedings of IMECE2004-60862, pp. 1-6, Anaheim, CA, Nov. 13-19, 2004.
Takagi et al., "Continuous Particle Separation in a Microchannel having Asymmetrically Arranged Multiple Branches,", Lab on a Chip 2005, Lab Chip, 2005, 5, pp. 778-784, May 19, 2005.
Zhang et al., "Continuous Flow Separation of Particles Within an Asymmetric Microfluidic Device," Lab on a Chip 2006, Lab Chip, 2006, 6, pp. 561-566, Mar. 13, 2006.
Narayanan et al., "A Microfabricated Electrical SPLITT System," Lab on a Chip 2006, Lab Chip, 2006, 6, pp. 105-114, Dec. 5, 2005.
Kapishnikov et al., "Continuous Particle Size Separation and Size Sorting Using Ultrasound in a Microchannel," Journal of Statistical Mechanics: Theory and Experiment, P01012, pp. 1-15, 2006.
Brenner, "Polymer Fabrication and Microfluidic Unit Operations for Medical Diagnostics on a Rotating Disk," Dissertation at Institute of Microsystems, University of Frieburg, Dec. 2005.
Ookawara et al., "Feasibility Study on Concentration of Slurry and Classification of Contained Particles by Microchannel," Chemical Engineering Journal, v. 101, pp. 171-178, 2004.
Matthews et al., "Particle Flow Modelling on Spiral Concentrators: Benefits of Dense Media for Coal Processing?," Second International Conference on CFD in the Minerals and Process Industries, CSIRO, Melbourne, Australia, pp. 211-216, Dec. 6-8, 1999.
Shi et al., "Radial Capillary Array Electrophoresis Microplate and Scanner for High-Performance Nucleic Acid Analysis," Analytical Chemistry, vol. 71, No. 23, pp. 5354-5361, Dec. 1, 1999.
Saffman, "The loft of a small sphere in a slow shear flow," J. Judith Mech. 1965, vol. 2, Part 2, pp. 385-400.

* cited by examiner

FLUIDIC DEVICE AND METHOD FOR SEPARATION OF NEUTRALLY BUOYANT PARTICLES

CROSS REFERENCE TO RELATED PATENTS AND APPLICATIONS

This application is related to co-pending, commonly assigned U.S. patent application Ser. No. 11/606,460, filed Nov. 30, 2006, entitled "Particle Separation and Concentration System," and co-pending, commonly assigned U.S. patent application Ser. No. 11/936,753, filed on Nov. 7, 2007, entitled "Device and Method for Dynamic Processing in Water Purification," and naming Lean et al. as inventors.

INCORPORATION BY REFERENCE

This application is related to co-pending, commonly assigned U.S. patent application Ser. No. 11/606,460, filed Nov. 30, 2006, entitled "Particle Separation and Concentration System," and co-pending, commonly assigned U.S. patent application Ser. No. 11/936,753, filed on Nov. 7, 2007, entitled "Device and Method for Dynamic Processing in Water Purification," and naming Lean et al. as inventors which are both incorporated herein by this reference in its entirety.

BACKGROUND

Conventional municipal water treatment (MWT) and other types of water purification systems include multi-stage filtration and sequential process steps for coagulation, flocculation, and sedimentation. A minimum of two stages of filtration typically include coarse 2-3 mm mesh filters at the inlet and 20-40 μm multi-media filters for finishing, although many utilities have more intermediate filtration steps. Neutrally buoyant particles (e.g. particles having substantially the same density as water) can only be filtered or electro-chemically modified for sedimentation. Separation of these types of particles from water is very difficult. Moreover, such particles are typically TOC (total organic carbon) and contribute to major turbidity problems.

A spiral fluidic device useful for membrane-free filtration and separation was described in U.S. application Ser. No. 11/606,460, filed Nov. 30, 2006, entitled "Particle Separation and Concentration System," which is incorporated herein by this reference in its entirely. In general, such devices are very useful in connection with particles having density differences compared with water, thus creating centrifugal or buoyancy forces necessary for transverse migration through the channel for purposes of separation. However, neutrally buoyant particles present a special case and thus require additional fluidic considerations for separation. Heretofore, such additional considerations have not been fully explored.

BRIEF DESCRIPTION

In one aspect of the presently described embodiments, the system comprises an inlet to receive at least a portion of the fluid containing the neutrally buoyant particles, a spiral channel within which the fluid flows in a manner such that the neutrally buoyant particles flow in a tubular band offset from a center of the channel, a first outlet for the fluid within which the tubular band flows, and, a second outlet for the remaining fluid or effluent.

In another aspect of the presently described embodiments, the inlet is angled to facilitate earlier formation of the tubular band along an inner wall of the spiral channel using a Coanda effect where wall friction helps to attach impinging flow.

In another aspect of the presently described embodiments, the system further comprises a second spiral channel nested with the spiral channel such that the tubular band is narrowed as a result of flowing through the second spiral channel.

In another aspect of the presently described embodiments, the system further comprises a second inlet connected to the second outlet of the spiral channel to receive the remaining fluid, a second spiral channel within which the remaining fluid flows such that the remaining neutrally buoyant particles flow in a second tubular band offset from the center of the second channel, a third outlet for the fluid within which the second tubular band flows, and, a fourth outlet for more remaining fluid.

In another aspect of the presently described embodiments, the remaining neutrally buoyant particles are of a different size than the neutrally buoyant particles output through the first outlet.

In another aspect of the presently described embodiments, the system further comprises a second spiral channel within which at least another portion of the fluid flows.

In another aspect of the presently described embodiments, the system further comprises a recirculation channel between the first outlet and the inlet.

In another aspect of the presently described embodiments, the tubular band is formed as a function of at least one of fluid viscosity, average channel velocity, particle radius, fluid density, hydraulic diameter of channel, angular velocity, and differential velocity across particles.

In another aspect of the presently described embodiments, the tubular band is offset from the center of the channel as a function of a radius of curvature of the spiral channel.

In another aspect of the presently described embodiments, the spiral channel is a spiral wound structure.

In another aspect of the presently described embodiments, the spiral channel is a helical spiral structure.

In another aspect of the presently described embodiments, the method comprises receiving at least a portion of the fluid containing the neutrally buoyant particles at an inlet, establishing a flow of the fluid in a spiral channel wherein the neutrally buoyant particles flow in a tubular band through the spiral channel in an asymmetric manner, outputting the fluid within which the tubular band flows through a first outlet of the channel, and, outputting the remaining fluid through a second outlet of the spiral channel.

In another aspect of the presently described embodiments, the fluid is received at an angle to facilitate the formation of the tubular band along an inner wall of the spiral channel.

In another aspect of the presently described embodiments, the method further comprises establishing a second flow of the fluid through a second spiral channel nested with the spiral channel to narrow the tubular band.

In another aspect of the presently described embodiments, the method further comprises establishing a flow of the remaining fluid in a second spiral channel cascaded with the first spiral channel to separate neutrally buoyant particles of a different size than the neutrally buoyant particles output through the first outlet.

In another aspect of the presently described embodiments, the method further comprises establishing a flow of at least another portion of fluid in a second spiral channel.

In another aspect of the presently described embodiments, the method further comprises re-circulating in the system at least a portion of the fluid output through the first outlet.

In another aspect of the presently described embodiments, the flow of neutrally buoyant particles in a tubular band is adjustable as a function of fluid viscosity, average channel velocity, particle radius, fluid density, hydraulic diameter of the channel, angular velocity, and differential velocity across particles.

In another aspect of the presently described embodiments, the asymmetric manner of flow of the tubular band is a function of a radius of curvature of the spiral channel.

DETAILED DESCRIPTION

The presently described embodiments use a curved channel of a spiral device to introduce a centrifugal force upon neutrally buoyant particles (e.g., particles having substantially the same density as water, or the fluid in which the particles reside) flowing in a fluid, e.g. water, to facilitate improved separation of such particles from the fluid. As these neutrally buoyant particles flow through the channel, a tubular pinch effect causes the particles to flow in a tubular band. The introduced centrifugal force perturbs the tubular band (e.g. forces the tubular band to flow in a manner offset from a center of the channel), resulting in an asymmetric inertial migration of the band toward the inner wall of the channel. This force balance allows for focusing and compaction of suspended particulates into a narrow band for extraction. The separation principle contemplated herein implements a balance of the centrifugal and fluidic forces to achieve asymmetric inertial equilibrium near the inner sidewall. Angled impingement of the inlet stream towards the inner wall also allow for earlier band formation due to a Coanda effect where wall friction is used to attach the impinging flow The presently described embodiments relate to a membrane-free filtration technology that is capable of continuous flow and high throughput operation. The working principle relies primarily on purely fluidic flow in curved channel structures, eliminating the need for filter-interfaces or external force-fields. Balanced transverse force components concentrate and divert particle streams according to the designed size cut-off. This spiral flow filtration concept can address size and mass based separation of micro-particles, including biological agents. The design simplicity makes this device amenable both to inline integration with other downstream processes and to serve as stand-alone, high-throughput, macro-scale or fine micro-scale lab-on-chip applications.

Figure 1:
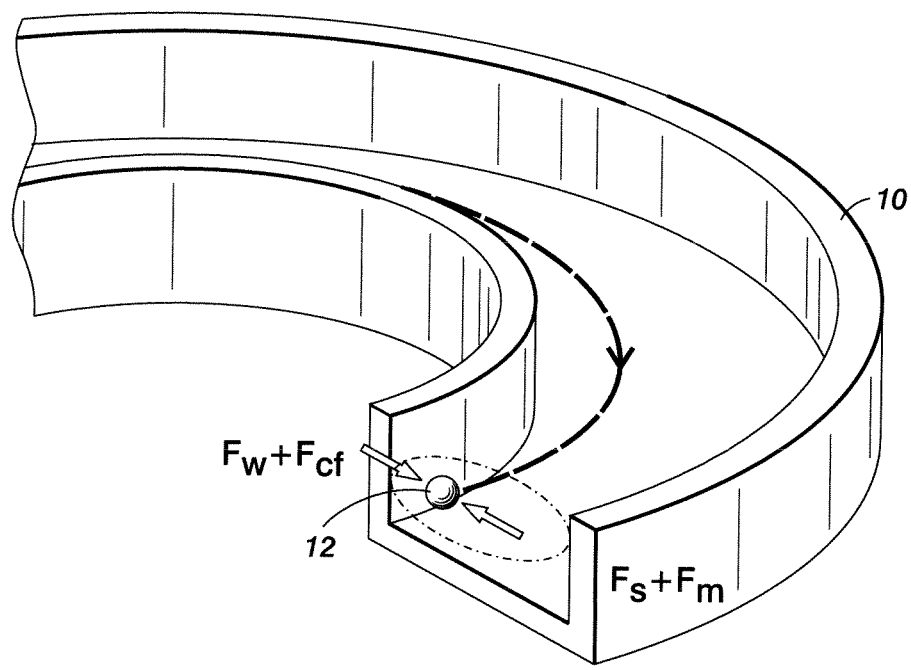
FIG. 1 is a representation of a particle flowing through a channel and forces acting thereon.

With reference to FIG. 1, a curved channel 10 (e.g. a curved portion of a spiral) having a particle 12 flowing there through is shown. As can be seen, asymmetric tubular pinch effects in the channel—created by various forces—are shown. The forces include a lift force $F_W$ from the inner wall, a Saffman force $F_S$, Magnus forces $F_m$ and a centrifugal force $F_{cf}$. It should be appreciated that the centrifugal force $F_{cf}$ is generated as a function of the radius of curvature of the channel. In this regard, this added centrifugal force $F_{cf}$ induces the slow secondary flow or Dean vortex flow (shown by the dashed arrows) which perturbs the symmetry of the regular tubular pinch effect. Particles are concentrated in the inner equilibrium of the velocity contour (shown in the dashed ellipses).

More specifically, fluidic shear in straight channels is known to generate lateral forces which cause inertial migration of particulates. G. Segre and A. Silberberg, Nature, v. 189, p. 209 (1961), G. Segré and A. Silberberg, J. Fluid Mech., v. 14, p. 136 (1962), D. Leighton and A. Acrivos, Z. angew. Math. Phys., v. 36 p. 174 (1985), P. Cherukat, and J. B. McLaughlin, J. Fluid Mech., v. 263, p. 1 (1994), P. G. Saffman, J. Fluid Mech., v. 22, p. 385 (1965), S. I. Rubinow and J. B. Keller, J. Fluid Mech., v. 11, p. 447 (1961), B. P. Ho and L. G. Leal, J. Fluid Mech., v. 65, p. 365 (1974), P. Vasseur and R. G. Cox, J. Fluid Mech., v. 78, p. 385 (1976), J. Feng, H. H. Hu and D. D. Joseph, J. Fluid Mech., v. 277, p. 271 (1994), E. Ashmolov, J. Fluid Mech., v. 381, p. 63 (1999), E. Ashmolov, Phys. Fluids, v. 14, p. 15 (2002), J.-P. Matas, J. F. Morris and E. Guazzelli, J. Fluid Mech., v. 515, p. 171 (2004), B. H. Yang, J. Wang, D. D. Joseph, H. H. Hu, T.-W. Pan and R. Glowinski, J. Fluid Mech., v. 540, p. 109 (2005), E. E. Michaelides, J. Fluids Eng., v. 125, p. 209, (2003), P. Cherukat and J. B. McLaughlin, Int. J. Multiphase Flow, v. 16, p. 899 (1990), P. Cherukat, J. B. McLaughlin and A. L. Graham, Int. J. Multiphase Flow, v. 20, p. 339 (1994).

G. Segré and A. Silberberg, Nature, v. 189, p. 209 (1961), and G. Segré and A. Silberberg, J. Fluid Mech., v. 14, p. 136 (1962), experimentally demonstrated a tubular pinch effect where neutrally buoyant particles migrate to form a symmetric band that is 0.6 D wide, where D is the channel diameter. In quadratic Poiseuille flow, three contributions have explained the lateral migration of a rigid sphere. The wall lift, $F_W$, acts to repel particulates from the wall due to lubrication. D. Leighton and A. Acrivos, Z. angew. Math. Phys., v. 36 p. 174 (1985), P. Cherukat, and J. B. McLaughlin, J. Fluid Mech., v. 263, p. 1 (1994). The second contribution is the Saffman inertial lift, $F_S$, towards the wall due to shear slip, $$F_s = 6.46 \eta V a R_e^{1/2} \quad (1)$$

where η, V, a, and Re are respectively, the fluid viscosity, average channel velocity, particle radius, and channel Reynold's number given by:

$$R_e = \rho V D / \eta \quad (2)$$

with ρ and D being the fluid density and hydraulic diameter of the channel. [10, 14]. The third is the Magnus force, $F_m$, due to particle rotation towards the wall, $$F_m = \pi a^3 \rho \vec{\Omega} \times \vec{V} \quad (3)$$

where $\Omega_r$ is the angular velocity given by ΔV/r and ΔV is the differential velocity across the particle S. I. Rubinow and J. B. Keller, J. Fluid Mech., v. 11, p. 447 (1961). $F_W$ dominates near the wall and achieves equilibrium with the combined effects of $F_s$ and $F_m$ to confine particles in a band. G. Segre and A. Silberberg, J. Fluid Mech., v. 14, p. 136 (1962), developed a reduced length parameter to scale this tubular pinch effect in a simple form, $$L = \left(\frac{\rho Vl}{\eta}\right)\left(\frac{a}{d}\right)^3 \quad (4)$$

where l is the actual channel length and d is the hydraulic channel radius. In curvilinear channel geometry, a centrifugal force, $F_{cf}$, modifies the symmetric tubular pinch effect. The fluid inertia from this force causes a secondary transverse flow or Dean vortex, P. Cherukat and J. B. McLaughlin, Int. J. Multiphase Flow, v. 16, p. 899 (1990), P. Cherukat, J. B. McLaughlin and A. L. Graham, Int. J. Multiphase Flow, v. 20, p. 339 (1994), S. A. Berger, L. Talbot and L.-S. Yao, Ann. Rev. Fluid Mech., v. 15, p. 461 (1983), Yu. P. Gupalo, Yu. V. Martynov and Yu. S. Ryazantsev, Fluid Dyn., 12, 109 (1977) which is a double recirculation as shown by the dot arrows in FIG. 1. The Dean number is a measure of the strength of this recirculation:

$$D_e = 2(d/R)^{1/2} R_e \quad (5)$$

where R is the radius of curvature of the channel S. A. Berger, L. Talbot and L.-S. Yao, Ann. Rev. Fluid Mech., v. 15, p. 461 (1983). Particles in mid-elevation migrate transversely outward with the Dean vortex, are repelled by the wall lift, and continue to loop back along the top and bottom walls towards the inside wall. The combined Saffman and Magnus forces are large in comparison to the viscous drag of the Dean vortex so particles are trapped in a force minimum located adjacent and closer to the inner wall.

So, it is apparent that the contemplated tubular band is formed as a function of at least one of fluid viscosity, average channel velocity, particle radius, fluid density, hydraulic diameter of channel, angular velocity, and differential velocity across particles. Moreover, as noted above, the tubular band is offset from the center of the channel as a function of a radius of curvature of the spiral channel. So, the configuration and operation of the system is a function of the factors contemplated, for example, by Equation 4. These factors or parameters are highly scalable and will vary as a matter of application in the range from micro-scale devices to macro-scale devices. Examples are provided herein; however, other implementations are contemplated.

Figure 2A:
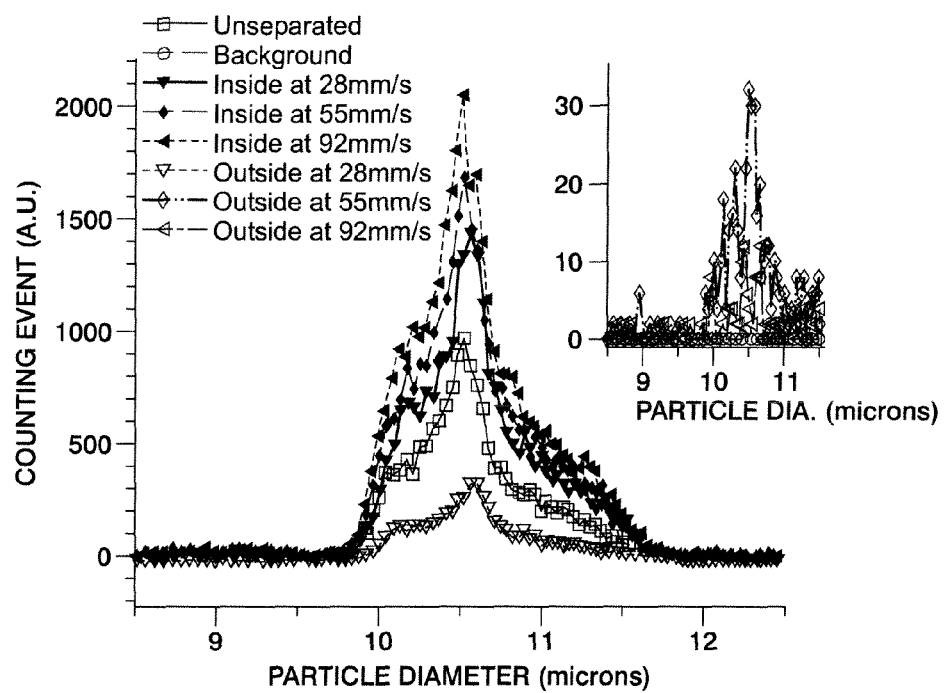
FIGS. 2(a) and (b) illustrate a selected quantification of particle extraction.
Figure 2B:
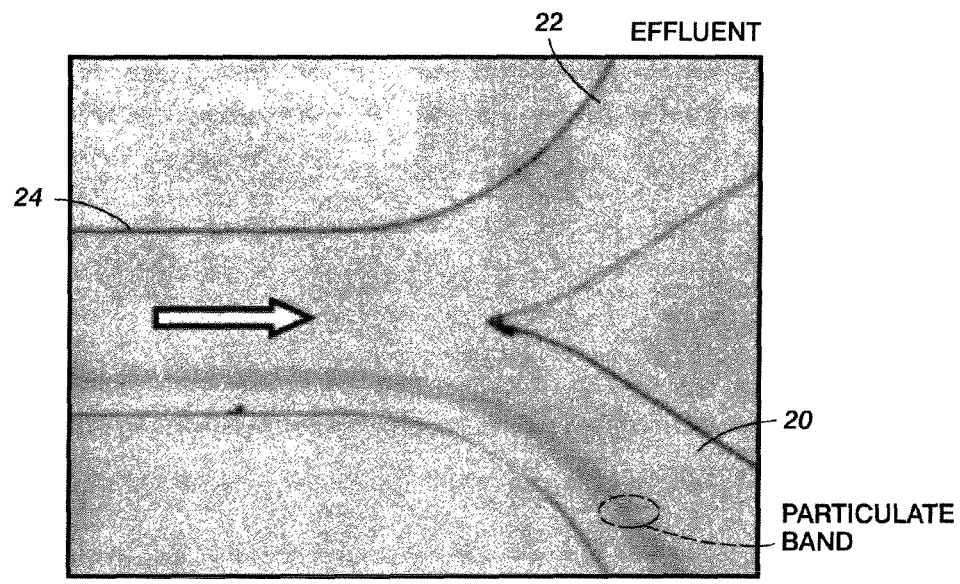

Implementation of the methodology described herein results in a system whereby particles can be separated within a spiral channel and output in a manner so as to separate particles of selected sizes from an effluent stream. For example, with reference to FIG. 2, a Coulter counter quantification of such particle extraction is illustrated. At 92 mm/s flow velocity, the concentration ratio of extracted particles in a particulate band 20, as shown in FIG. 2(b), is 300 times that of the effluent 22 that is being output by the spiral channel 24. Experimentally, this calculates to a 99.1% efficiency of particle removal using the presently described embodiments.

Other advantages of the presently described embodiments include:

1) Filtration capacity such as sample, volume, hydraulic retention times, filtration rate, cut-off particle size, and concentration factor can be adjusted by tailoring fluidic and dimensional parameters.

2) Extension to size separation would merely involve tailoring of the flow parameters for a monotonic range of particle sizes and providing capture channels in sequential manner along the spiral channel.

3) Ability to cascade several of these spiral structures, each tailored for a decreasing particle size range cut-off.

4) Design simplicity making this device amenable both to inline integration with other downstream processes and to serve as a stand-alone application.

5) Large dynamic size range in its filtration capacity makes it suited for both high-throughput macroscale and fine micro-scale lab-on-chip applications.

6) Parallelization of modular units can be realized for higher throughput.

7) This membrane-free device has the desirable combinations of high-throughput and low cost, making it inherently suited for preparative filtration in the range of micro-scale to macro-scale applications.

8) Design technique is provided for a spiral structure for rapid fluidic separation of neutrally buoyant particles without a membrane.

9) Double nested spiral channels can be implemented to compact band successively from both sides.

10) Highly scalable implementation based on reduced length formula is realized.

11) Flocculation and sedimentation steps can be eliminated in conventional water treatment.

12) Contemplated structures may be used for other applications in water including: IC fab reclaim, cooling tower water, MBR (membrane bio reactor), pre-treatment for RO (reverse osmosis).

It should be appreciated that these advantages may be achieved in a variety of different embodiments. These embodiments will vary as a function of the parameters noted above which are controllable and/or configurable through channel design and operational parameters. Nonetheless, the described systems generally include an inlet to receive at least a portion of the fluid containing the neutrally buoyant particles, a spiral channel within which the fluid flows in a manner such that the neutrally buoyant particles flow in a tubular band offset from a center of the channel, a first outlet for the fluid within which the tubular band flows and a second outlet for the remaining fluid. So, in operation, the method includes receiving at least a portion of the fluid containing the neutrally buoyant particles at an inlet, establishing a flow of the fluid in a spiral channel wherein the neutrally buoyant particles flow in a tubular band through the spiral channel in an asymmetric manner, outputting the fluid within which the tubular band flows through a first outlet of the channel and outputting the remaining fluid through a second outlet of the spiral channel.

Figure 3A:
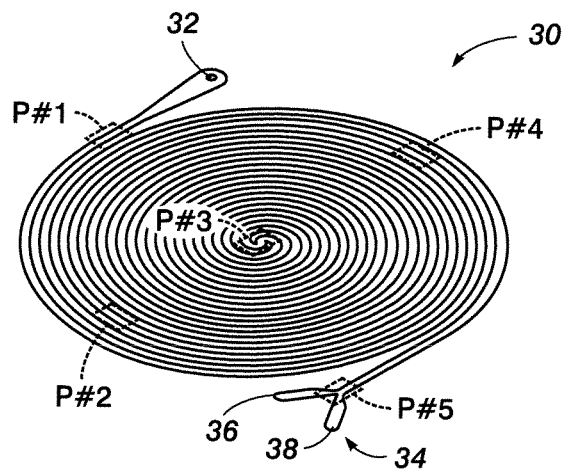
FIGS. 3(a)-(f) illustrate an embodiment of a spiral device according to the presently described embodiments.

In this regard, FIG. 3(a) illustrates a spiral structure 30 that may be implemented in accordance with the presently described embodiments. This structure 30 is a double nested structure wherein a first spiral channel is nested with a second spiral channel. That is, the inlet 32 is connected to a spiral channel that spirals to the center of the structure 30 and then spirals back out to the outer periphery of the structure 30—without interruption other than a change in direction. So, the outlet 34, having a first outlet portion 36 and a second outlet portion 38, is disposed on the outer periphery, as opposed to the center of the structure 30.

Figure 8:
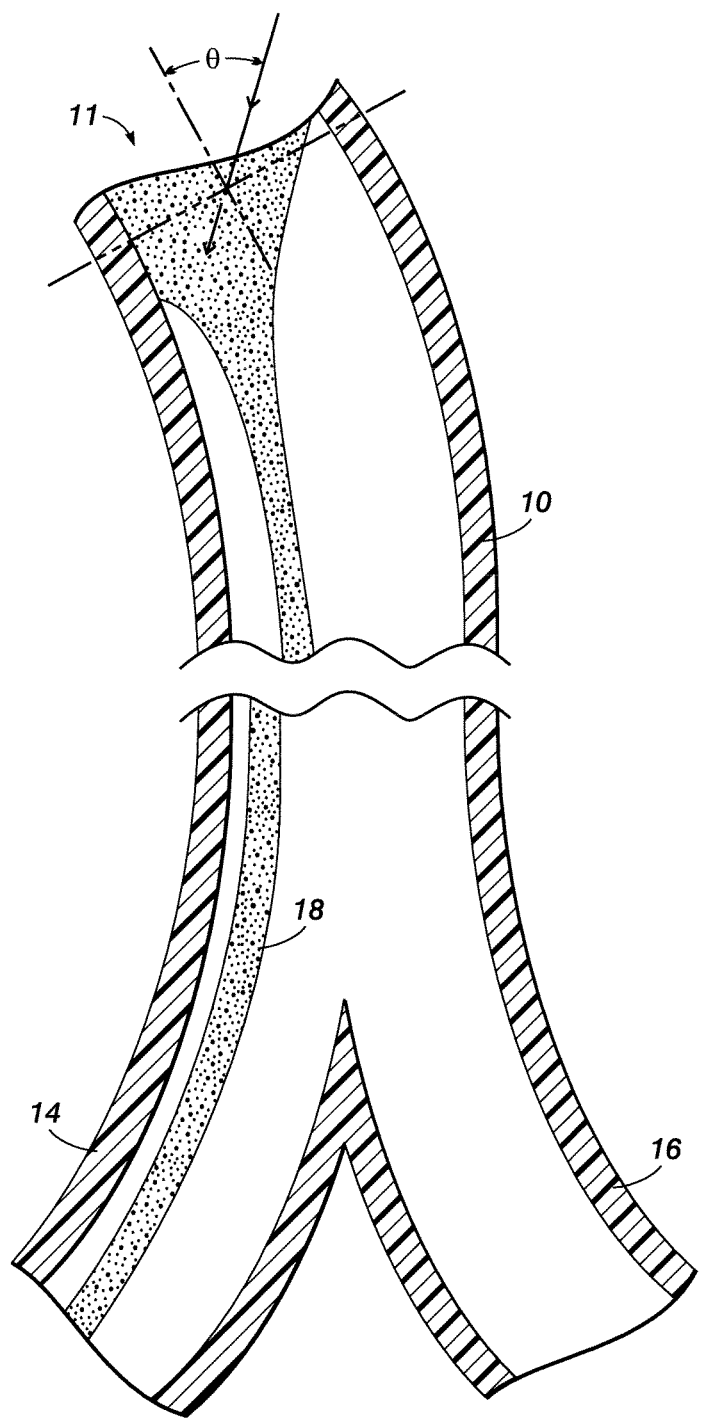

It should also be appreciated that the inlet could provide for an angled or inclined entry of fluid to the system to facilitate quicker formation of the tubular band along an inner wall of the spiral channel. This is the result of the Coanda effect where wall friction is used to attach the impinging flow. With reference to FIG. 8, the channel 10 has an inlet 11 wherein the inlet stream is angled toward the inner wall by an angle θ. The tubular band 18 is thus formed earlier for egress out of the outlet 14. Of course, the second outlet 16 for the remaining fluid in which the band 18 does not flow is also shown. It should be understood that the inlet angle may be realized using any suitable mechanism or technique.

With reference back now to FIG. 3(a) according to the presently described embodiments, the noted lateral forces across the spiral channel geometry transform a relatively homogeneous distribution of particles at the inlet 32 into an ordered band at the outlet 34. After spiral circulation, particles are collected at an inside outlet 36 and the effluent (water) are collected at an outside outlet 38.

Figure 3B:
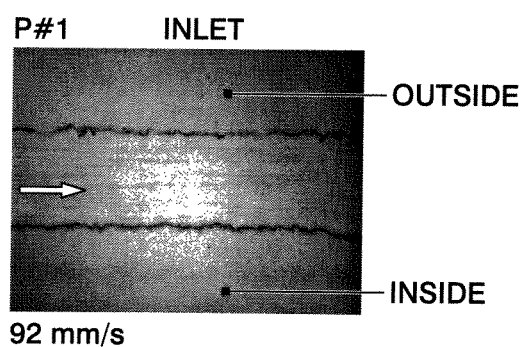
Figure 3C:
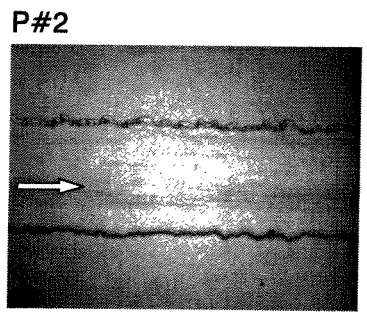
Figure 3D:
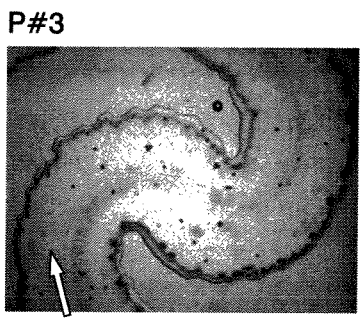
Figure 3E:
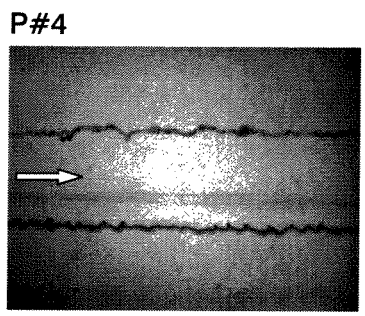
Figure 3F:
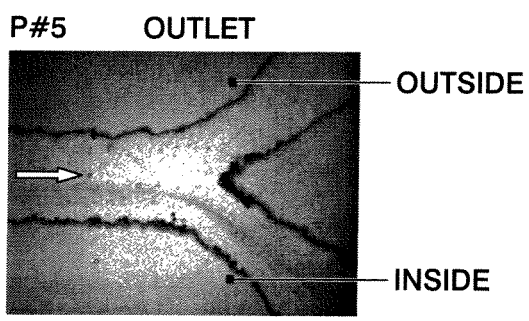

Sequential images along the fluidic path are shown. Images are rotated and mirrored to match their flow directions for comparison. The bottom sides are toward the center of the spirals. The fluid runs left to right or bottom to top at the mean fluidic velocity of 92 mm/s. As shown, a dispersed particle suspension was introduced into an inlet (P#1) (FIG. 3(b)) with an average flow velocity of 92 mm/s. After two spiral turns (P#2) (FIG. 3(c)), the particles closest to the inner wall (lower boundary) have started to concentrate at 0.6w from the channel center where w is a half of the channel width. At the transitional point after 12 turns (P#3) (FIG. 3(d)), particle concentration shows a band with a sharp edge on the inside and a more diffuse edge on the outside. It should be noted that this (P#3) (FIG. 3(d)) is a transition point to change the flow from clockwise to counter-clockwise direction. This transition has beneficial effects on compacting the band of particles. After the transition point, the sharp edge of the band is switched to the outside and the continuing lateral force acts to mitigate against the dispersive effects of Brownian motion and diffusion. On the other hand, the diffuse outside edge of the band is switched to the inside and is now subjected to the compacting effect of the centrifugal and lift force induced effect. As a result, a sharp edge is developed as observed (P#4) (FIG. 3(e)). The concentrated band of particles are diverted into the inside outlet (P#5, L=34.2) (FIG. 3(f)) whilst the effluent stream is routed into the outside outlet. Segre and Silberberg showed that the reduced length parameter for one order of concentration difference should be L>9 G. Segré and A. Silberberg, J. Fluid Mech., c. 14, p. 136 (1962). The concentration difference between the collected samples is expected be about two orders of magnitude. The resultant band is less than 0.2 D wide and could be further compacted.

Particle counting of collected samples after filtration confirm the results from the preceding observation. After the samples were filtered with different flow rates, the collected samples were diluted to 50 times for coulter counting (Z2™ COULTER COUNTER®, Beckman Coulter, Calif., USA). The concentration of particles from the outer outlet decreased as the flow velocity increased. As discussed previously, the efficiency of filtration depends on the corresponding length L that is a function of (particle velocity). Faster flow velocity improved filtration efficiency (particle capture efficiency) from 64.7% at 23 mm/s to 99.1% at 92 mm/s. The separation factor or ratio of concentrations of the particle and effluent outlets exceeds 300×, and can be further optimized. The important effect of the spiral geometry is to focus the particles into a narrow band through the asymmetric tubular pinch effect. This nested double spiral (FIG. 3(a)) acts to sequentially compact each side of the band resulting in a sharper and narrower band than is predicted by the tubular pinch effect alone.

Figure 4:
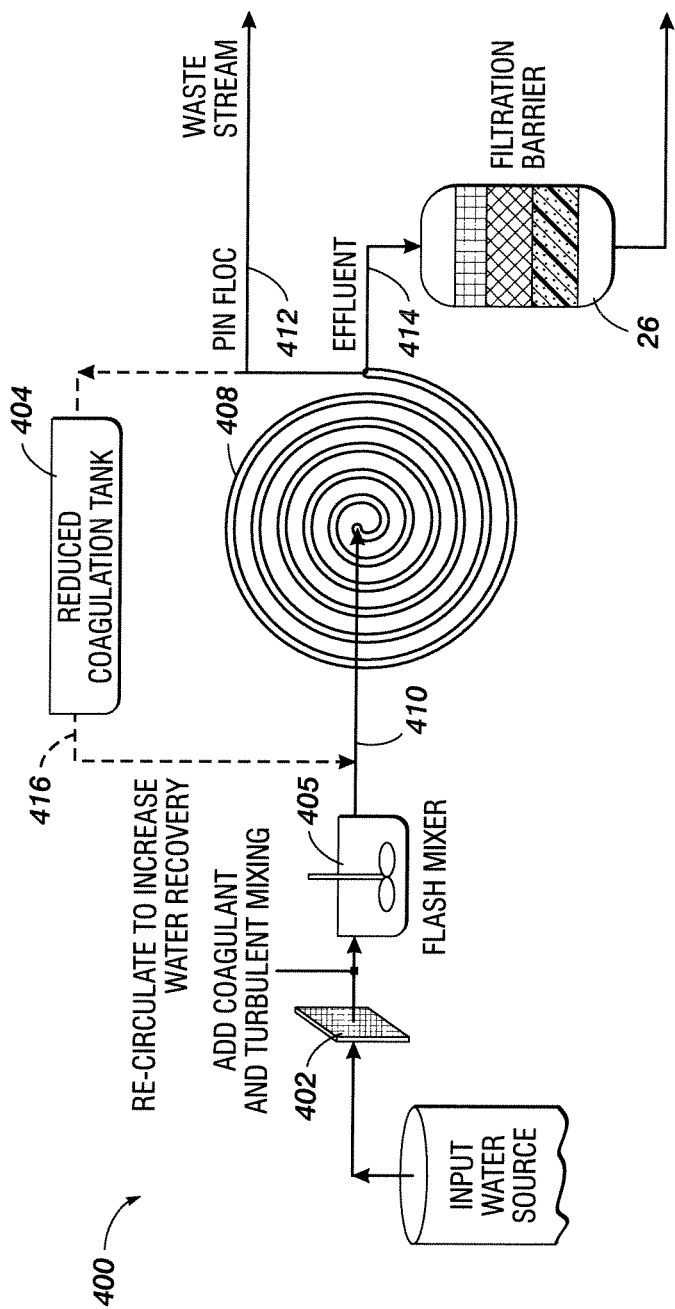
FIG. 4 illustrates another embodiment according to the presently described embodiments.

In another embodiment, FIG. 4 illustrates the implementation of a spiral separator device according to the presently described embodiments within a purification system 400. As shown, the system includes a screen 402, a flash mixer 405, and a reduced coagulation tank 404. The spiral device 408 according to the presently described embodiments includes an inlet 410 as well as a first outlet 412 and a second outlet 414. Also shown in the system 400 is a recirculation channel or path 416 which is disposed between the inlet 410 and the coagulation tank 404.

In operation, fluid containing neutrally buoyant particles is received in the system and first filtered through the screen 402. The filtered water is then flash-mixed 405 before being introduced into the spiral device 408 through inlet 410. As the fluid flows in the spiral device 408, the tubular band of neutrally buoyant particles is maintained to flow in an asymmetric manner, relative to the center of the channel. This asymmetry allows for convenient separation of the fluid within which the tubular band flows (which is output through outlet 412) and the remaining fluid (which is output through outlet 414). The concentrate stream is optionally re-circulated back, for example, to the reduced coagulation tank from outlet 412 to increase water recovery.

Figure 5:
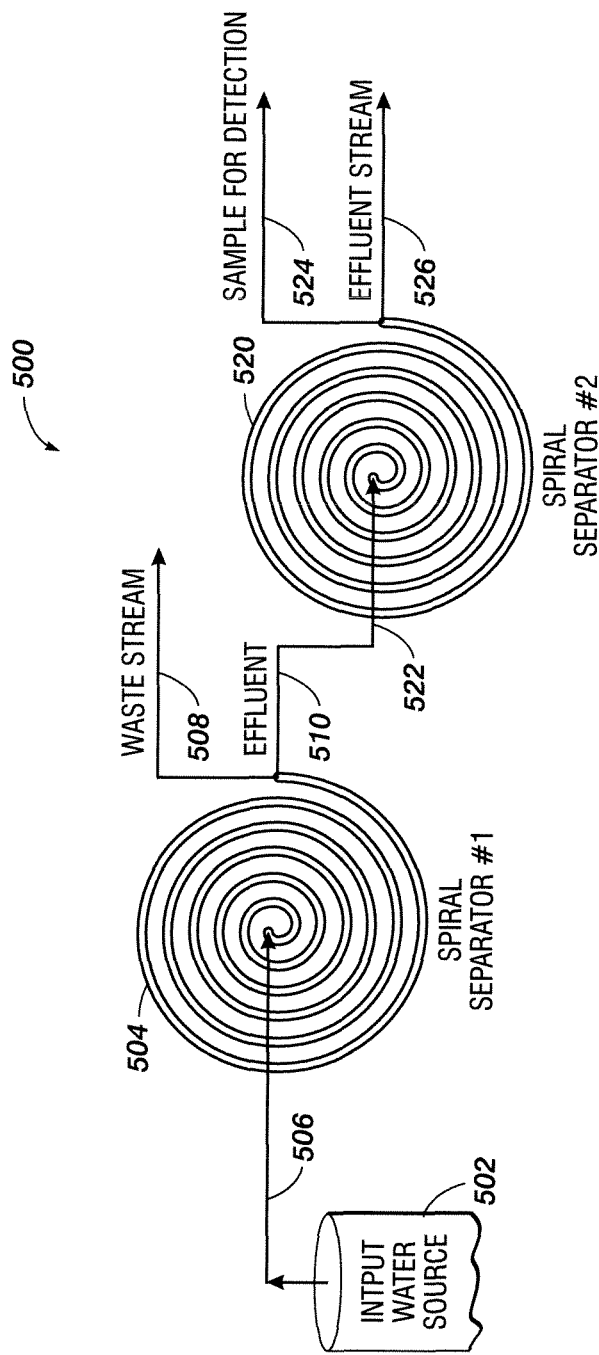
FIG. 5 illustrates still another embodiment according to the presently described embodiments.

With reference now to FIG. 5, a further embodiment to the presently described embodiments is shown. In this embodiment, a purification system 500 includes a two-stage spiral separation system to isolate particles of different sizes. In the example system shown, the particles are isolated in a 1 to 10 micrometer range. As shown, the system includes an input water source 502 connecting to a spiral separator 504 having an inlet 506, as well as a first outlet 508 and a second outlet 510. The second outlet 510 is connected to a second spiral separator 520 by way of an inlet 522. The spiral separator 520 includes a first outlet 524 and a second outlet 526 as shown.

In operation, the system 500 with the cascaded spiral stages facilitates a first separation of particles between those of greater than 10 micrometers being output from the first spiral separator in a waste stream and particles less than 10 micrometers being input to the second spiral separator 520 for further processing. The second spiral separator then separates particles greater than 1 micrometer and outputs fluid within which those particles reside by way of outlet 524. The remaining fluid or effluent is output through outlet 526. In this manner, the system 500 is able to isolate particles between 1 and 10 micrometers for various sampling processing. This concept can be extended by continued cascading of spiral structures with smaller size cut-offs to achieve fractionation of particles with decreasing size ranges.

Figure 6A:
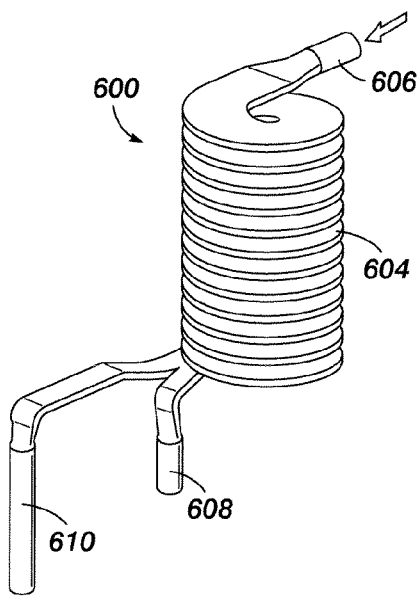
FIGS. 6(a) and (b) illustrate still further embodiments according to the presently described embodiments.
Figure 6B:
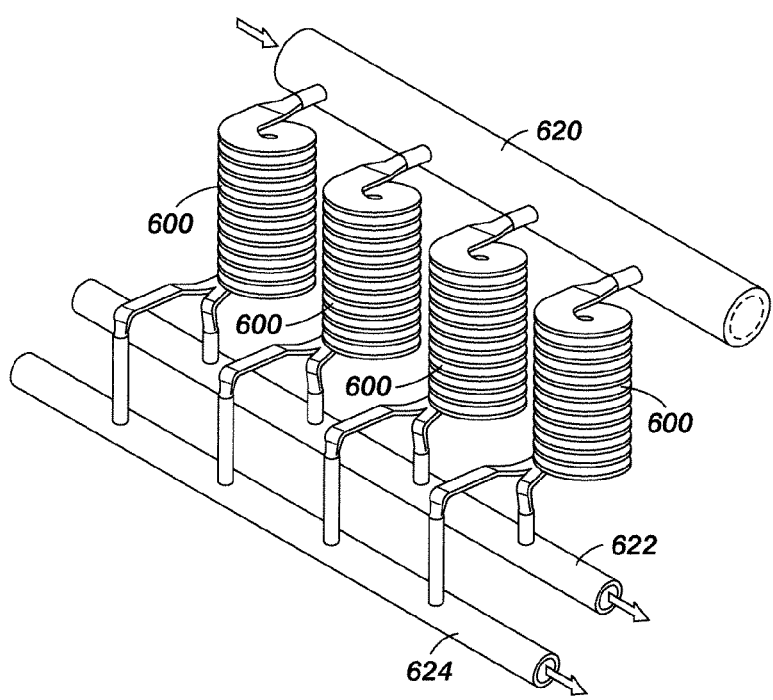

With reference now to FIGS. 6 (a) and (b), a still further embodiment is shown. In FIG. 6, a spiral device 600 according to the presently described embodiments is illustrated. In this embodiment, the spiral device 600 takes the form of a helical spiral. In this regard, the spiral body portion of the device 604 is a helical spiral that has an inlet 606, a first outlet 608 and a second outlet 610. As shown in FIG. 6(b), a spiral device such as that shown in FIG. 6(a) can be disposed in a parallel arrangement to increase throughput of the system. As shown, spiral devices 600 are all connected to an input main 620 from a fluid manifold and the respective first outlets of the devices 600 are connected to a first outlet main 622. The second outlets of the devices 600 are connected to a second outlet main 624.

Figure 7A:
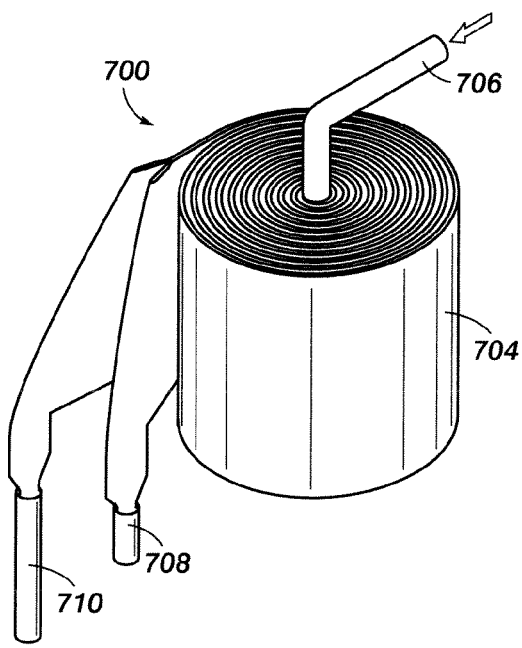
FIGS. 7(a) and (b) illustrate still further embodiments according to the presently described embodiments; and, FIG. 8 illustrates a still further embodiment according to the presently described embodiments.
Figure 7B:
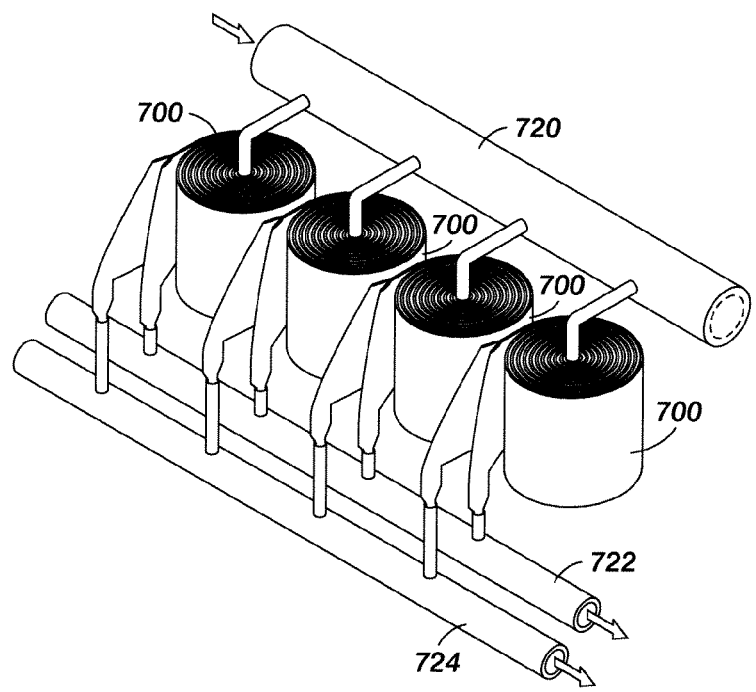

With reference to FIGS. 7(a) through 7(b), a similar system is shown. However, the embodiment of FIG. 7(a) shows a spiral device 700 that is a spiral wound device. This device 700 includes a spirally wound body 704 having inlet 706, a first outlet 708 and a second outlet 710. As with the embodiment illustrated in FIGS. 6(a) and 6(b), the device 700, as shown in FIG. 7(b), may be disposed in a system wherein a plurality of devices 700 are connected in parallel to a water inlet main 720 from a fluid manifold. Similarly, the first outlet lines for the devices are connected to a first outlet main 722. The second outlet lines of the devices 700 are connected to a second outlet main 724.

It should be appreciated that the spiral devices contemplated herein may take a variety of forms including the form of any of the spiral devices described in connection with co-pending and commonly assigned U.S. application Ser. No. 11/606,460, filed Nov. 30, 2006, entitled "Particle Separation and Concentration System", which is incorporated herein in its entirety by this reference, provided that such devices are configured, dimensioned and operated to advantageously address neutrally buoyant particles within fluid. Of course, appropriate modifications would be made to such devices to accommodate the presently described embodiments. Moreover, it should be appreciated that any of the spiral devices described or contemplated herein may be disposed in a cascaded manner, as shown in FIG. 5, or in a parallel manner, as shown in FIGS. 6(a), 6(b), 7(a) and 7(b). Still further, any suitable material may be used to form the spiral devices contemplated herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for separation of neutrally buoyant particles from a fluid, the system comprising:
   an inlet to receive at least a portion of the fluid containing the neutrally buoyant particles;
   a spiral channel having a curvilinear channel geometry tailored to form in the fluid a tubular band having the neutrally buoyant particles flowing therein, the tubular band flow being through the channel in an asymmetric manner based on a balance of forces and inducement of a Dean vortex flow, wherein the flow of neutrally buoyant particles in the tubular band is a function of fluid viscosity, average channel velocity, particle radius, fluid density, hydraulic diameter of the channel, angular velocity, and differential velocity across particles;
   a first outlet for the fluid within which the tubular band flows; and,
   a second outlet for the remaining fluid.

2. The system as set forth in claim 1 wherein the inlet is angled to facilitate earlier formation of the tubular band along an inner wall of the spiral channel.

3. The system as set forth in claim 1 further comprising a second spiral channel nested with the spiral channel such that the tubular band is narrowed as a result of flowing through the second spiral channel.

4. The system as set forth in claim 1 further comprising:
   a second inlet connected to the second outlet of the spiral channel to receive the remaining fluid;
   a second spiral channel within which the remaining fluid flows such that the remaining neutrally buoyant particles flow in a second tubular band offset from the center of the second channel;
   a third outlet for the fluid within which the second tubular band flows; and,
   a fourth outlet for more remaining fluid.

5. The system as set forth in claim 4 wherein the remaining neutrally buoyant particles are of a different size than the neutrally buoyant particles output through the first outlet.

6. The system as set forth in claim 1 further comprising a second spiral channel within which at least another portion of the fluid flows.

7. The system as set forth in claim 1 further comprising a recirculation channel between the first outlet and the inlet.

8. The system as set forth in claim 1 wherein the asymmetric manner of flow of the tubular band is a function of a radius of curvature of the spiral channel.

9. The system as set forth in claim 1 wherein the spiral channel is a spiral wound structure.

10. The system as set forth in claim 1 wherein the spiral channel is a helical spiral structure.

11. A method for separating neutrally buoyant particles from a fluid, the method comprising:
    receiving at least a portion of the fluid containing the neutrally buoyant particles at an inlet;
    establishing a flow of the fluid in a spiral channel tailored to generate a tubular band in the fluid having the neutrally buoyant particles flowing therein, the tubular band flowing through the spiral channel in an asymmetric manner based on a balance of forces and inducement of a Dean vortex flow, the flow of neutrally buoyant particles in the tubular band being adjustable as a function of fluid viscosity, average channel velocity, particle radius, fluid density, hydraulic diameter of the channel, angular velocity, and differential velocity across particles;
    outputting the fluid within which the tubular band flows through a first outlet of the channel; and,
    outputting the remaining fluid through a second outlet of the spiral channel.

12. The method as set forth in claim 11 wherein the fluid is received at an angle to facilitate the formation of the tubular band along an inner wall of the spiral channel.

13. The method as set forth in claim 11 further comprising establishing a second flow of the fluid through a second spiral channel nested with the spiral channel to narrow the tubular band.

14. The method as set forth in claim 13 further comprising establishing a flow of the remaining fluid in a second spiral channel cascaded with the first spiral channel to separate neutrally buoyant particles of a different size than the neutrally buoyant particles output through the first outlet.

15. The method as set forth in claim 11 further comprising establishing a flow of at least another portion of fluid in a second spiral channel.

16. The method as set forth in claim 11 further comprising re-circulating in the system at least a portion of the fluid output through the first outlet.

17. The method as set forth in claim 11 wherein establishing the asymmetric manner of flow of the tubular band is a function of a radius of curvature of the spiral channel.

18. A system for separation of neutrally buoyant particles from a fluid, the system comprising:
    an inlet to receive at least a portion of the fluid containing the neutrally buoyant particles;
    a curved channel having a curvilinear channel geometry tailored to form in the fluid a tubular band having the neutrally buoyant particles flowing therein, the tubular band flow being through the channel in an asymmetric manner based on a balance of forces and inducement of a Dean vortex flow, wherein the flow of neutrally buoyant particles in the tubular band is a function of fluid viscosity, average channel velocity, particle radius, fluid density, hydraulic diameter of the channel, angular velocity, and differential velocity across particles;

a first outlet for the fluid within which the tubular band flows; and, a second outlet for the remaining fluid.

19. A system comprising:

fluid having neutrally buoyant particles therein;

an inlet to receive at least a portion of the fluid containing the neutrally buoyant particles;

a curved channel having a tailored curvilinear channel geometry causing fluid flows such that the neutrally buoyant particles flow in a tubular band, the tubular band flow being through the channel in an asymmetric manner based on a balance of forces and inducement of a Dean vortex flow, wherein the flow of neutrally buoyant particles in the tubular band is a function of fluid viscosity, average channel velocity, particle radius, fluid density, hydraulic diameter of the channel, angular velocity, and differential velocity across particles;

a first outlet for the fluid within which the tubular band flows; and, a second outlet for the remaining fluid.

20. A method for separating neutrally buoyant particles from a fluid, the method comprising:

receiving at least a portion of the fluid containing the neutrally buoyant particles at an inlet;

establishing a flow of the fluid in a curved channel tailored to generate a tubular band in the fluid having the neutrally buoyant particles flowing therein, the tubular band flowing through the channel in an asymmetric manner based on a balance of forces and inducement of a Dean vortex flow, the flow of neutrally buoyant particles in the tubular band being adjustable as a function of fluid viscosity, average channel velocity, particle radius, fluid density, hydraulic diameter of the channel, angular velocity, and differential velocity across particles;

outputting the fluid within which the tubular band flows through a first outlet of the channel; and, outputting the remaining fluid through a second outlet of the channel.

21. A method for separating neutrally buoyant particles from a fluid, the method comprising:

receiving at least a portion of the fluid containing the neutrally buoyant particles at an inlet;

establishing a flow of the fluid in a spiral channel tailored to generate a tubular band in the fluid having the neutrally buoyant particles flowing therein, the tubular band flowing through the spiral channel in an asymmetric manner;

adjusting the flow of neutrally buoyant particles in the tubular band as a function of fluid viscosity, average channel velocity, particle radius, fluid density, hydraulic diameter of the channel, angular velocity, and differential velocity across particles;

outputting the fluid within which the tubular band flows through a first outlet of the channel; and, outputting the remaining fluid through a second outlet of the spiral channel.

22. A method for separating neutrally buoyant particles from a fluid, the method comprising:

receiving at least a portion of the fluid containing the neutrally buoyant particles at an inlet;

establishing a flow of the fluid in a curved channel tailored to generate a tubular band in the fluid having the neutrally buoyant particles flowing therein, the tubular band flowing through the channel in an asymmetric manner;

adjusting the flow of neutrally buoyant particles in the tubular band as a function of fluid viscosity, average channel velocity, particle radius, fluid density, hydraulic diameter of the channel, angular velocity, and differential velocity across particles;

outputting the fluid within which the tubular band flows through a first outlet of the channel; and, outputting the remaining fluid through a second outlet of the channel.

23. The system as set forth in claim 18 wherein the asymmetric manner of flow of the tubular band is a function of a radius of curvature of the channel.

24. The system as set forth in claim 19 wherein the asymmetric manner of flow of the tubular band is a function of a radius of curvature of the channel.

* * * * *